(12) United States Patent
Jonnatti et al.

(10) Patent No.: US 6,172,862 B1
(45) Date of Patent: Jan. 9, 2001

(54) PARTIAL DISCHARGE RELAY AND MONITORING DEVICE

(76) Inventors: Anthony J. Jonnatti, 170 Woodcutter La., Palm Harbor, FL (US) 34683; David Sykes, 7060 58th St. North, Pinellas Park, FL (US) 33781

( * ) Notice: Under 35 U.S.C. 154(b), the term of this patent shall be extended for 0 days.

(21) Appl. No.: 09/330,324
(22) Filed: Jun. 11, 1999
(51) Int. Cl.$^7$ ........................................................ H02H 3/18
(52) U.S. Cl. ........................... 361/78; 361/86; 361/87; 361/35; 361/187; 340/647
(58) Field of Search ................................ 361/78, 35, 86–87, 361/170, 187; 340/646–647; 324/551, 541–542, 544

(56) References Cited

U.S. PATENT DOCUMENTS

| | | |
|---|---|---|
| 2,996,664 | 8/1961 | Vogel et al. . |
| 3,852,734 | * 12/1974 | Truax ................................... 340/647 |
| 4,775,839 | 10/1988 | Kosina et al. . |
| 4,897,607 | 1/1990 | Grunewald et al. . |
| 4,967,158 | 10/1990 | Gonzalez . |
| 5,132,629 | 7/1992 | Clinton et al. . |
| 5,323,117 | 6/1994 | Endoh et al. . |
| 5,365,177 | 11/1994 | Hamp, III et al. . |
| 5,469,067 | 11/1995 | Endoh et al. . |
| 5,506,511 | 4/1996 | Nilsson et al. . |
| 5,578,931 | 11/1996 | Russell et al. . |
| 5,642,038 | 6/1997 | Kim et al. . |
| 5,726,576 | 3/1998 | Miyata et al. . |
| 5,767,684 | 6/1998 | Steennis . |

* cited by examiner

*Primary Examiner*—Michael J. Sherry
(74) *Attorney, Agent, or Firm*—Larson & Larson, PA; James E. Larson (57) ABSTRACT

A portable partial discharge detecting device for measuring partial discharge in energized electrical systems encloses a relay circuit and a DC power source. A pair of sensor circuits are enclosed within electrically coupling clamping mechanisms and are coupled to the relay circuit at sensor inputs by cabling. The clamping mechanisms engage the ground leads of the electrical system. Trip and alarm networks of the relay circuit continuously compare the picocoulomb values of the partial discharge pulses against user set threshold values. Relays coupled to the trip and alarm networks respond if the threshold values are exceeded. The alarm setting is always set to a pick-up value equal to or less than the trip setting. The trip network relays are coupled to a control circuit of the electrical system and can take the system off-line. The alarm network relays are coupled to an alarm circuit and can warn the user that a certain level of partial discharge has been reached within the electrical system. The preferred system to monitor is a three phase power transformer.

39 Claims, 5 Drawing Sheets

PARTIAL DISCHARGE RELAY AND MONITORING DEVICE

BACKGROUND OF THE INVENTION

1. Field of the Invention

This invention relates to partial discharge detection devices. More particularly, it relates to a device capable of monitoring and detecting partial discharge in an insulation medium of an electrical system and controlling the electrical system coupled thereto in response to such detection.

2. Description of Prior Art

Partial discharge is an electrical phenomenon that can occur within an insulation medium in any electrical system having electrical conductors. Recently, the term partial discharge has been used to define a specific phenomenon that is different than that known as corona discharge. Partial discharge is a type of localized internal electrical discharge resulting from transient gaseous ionization in an insulation system when the voltage stress exceeds a critical value. Corona, on the other hand, is an external electrical discharge occurring as a result from the ionization of gases of the surrounding air by the high voltage (that which exceeds the critical value). Corona is often heard as acoustical noise about high-voltage transmission lines, representing sustained discharges in gases that have been energized by an intense electric field near the electrical conductors. Corona can often been seen as a bluish purple glow on the surface of and adjacent a conductor. In other words, where partial discharge is an internal discharge, corona is an external discharge. When reviewing prior art which was published before the 1980's, it is common for authors to refer to corona when really they are addressing partial discharge. For the purposes of this disclosure, a reference using the word corona will be understood to be describing the internal electrical phenomenon occurring within an insulation system known as partial discharge as defined hereinabove.

Partial discharge occurring within an insulation medium can be destructive upon the insulator. In particular, the free electrons in the insulator, accelerated by the electric field, which thereby produces the ionization, collide with the atoms of the insulation material resulting in accelerated breakdown of the insulation material. If the insulator is used in a electrical device such as a transformer, breakdown of the insulator could cause failure of the transformer. Failure of a transformer used by an electric generating power company could result in the explosion thereof causing injury to personnel, destruction of valuable property and interruption of electric power service to consumers. For these reasons, devices which can detect and monitor partial discharge in electrical devices are greatly needed.

Many attempts have been made at developing a device or system for measuring, monitoring and/or detecting partial discharge. One of the early innovators of improved partial discharge measuring devices was Vogel. U.S. Pat. No. 2,996,664 discloses a device, called a Corona Detector, to which he contributed. The detector seen therein utilizes an oscilloscope to directly display the charge, in coulombs, of a partial discharge pulse emanating from a piece of electrical equipment to be tested. The Vogel device employs a tuned transformer whose secondary winding produces a series of oscillations that directly indicates the charge of the partial discharge pulse in response to the primary winding being excited by the pulse. Unfortunately, the Vogel device does nothing more than detect partial discharge pulses and display a wave form on an oscilloscope. Nothing in Vogel suggests controlling the piece of equipment being tested nor providing a warning signal that the insulation in the electrical device is reaching a critical failure state. Further, the Vogel device requires that the user understand the operation of an oscilloscope, a device which renders readings which are very subjective. Ii is common for the results displayed on a oscilloscope to be interpreted differently by two or more users.

Many other attempts have been made to develop devices and methods for detecting partial discharge occurring in electrical systems. Some devices have employed antennas for receiving electromagnetic radiation from power transmissions lines and other devices where partial discharge may occur. Two such devices are shown in U.S. Pat. Nos. 4,775,839 to Kosina et al. and 5,726,576 to Miyata et al. Unfortunately, the use of an antenna for receiving signals relating to partial discharge has many disadvantages. One such disadvantage is the possibility of receiving unrelated electromagnetic radiation signals thereby producing a false reading for the actual device or system to be tested. Elaborate filtering circuits are needed to eliminate these false reads thereby raising the cost and technical sophistication of the partial discharge detecting device. Even with filtration, due to a lack of a controlled test environment (i.e., shielding or other means of containment), random disturbances, known to exist on multiple levels within the electromagnetic spectrum in the ambient air, can contribute to a corrupted test result. Examples of random disturbances include, solar and microwave radiation, beat frequency oscillations, lightening, RF from fluorescent lighting and other naturally and man made occurring phenomenon. Further, if the electrical system to be tested is a shielded power transformer, wherein multiple transformers are located within close proximity of one another (i.e., a power sub-station), it would be difficult to isolate and test a single transformer in the sub-station through the use of a device receiving a signal by means of an antenna. Even presuming proper isolation of a particular signal emanating from a particular piece of equipment, the reception of the signal utilizing an antennae is still extremely "position sensitive." For instance, since RF and acoustic signals follow the inverse square law, an operator would have great difficultly ascertaining whether the received signal has been attenuated; there is essentially no reference point. Further, the received signal could have been manipulated and/or distorted due to various wave propagation anomalies such as reflection, diffraction and refraction.

Yet other attempts at detecting partial discharge have resulted in the development of devices that apply a high frequency AC voltage test signal to the electrical system to be tested in order to determine whether any partial discharge will occur. Such a device can be seen in U.S. Pat. No. 5,365,177 to Hamp, III et al. Inherent disadvantages exist with this type of device, such as, for example, the necessity of providing the AC test voltage. One of the great needs for partial discharge detection devices is that systems in the field, such as power transformers, need to be tested for partial discharge. The operator testing such a transformer is hampered by the need to apply an AC test voltage in the field. Further, in utilizing the Hamp III device, the system to be tested must be removed from operation, thereby preventing a system test under normal operating and load conditions.

Yet even further attempts at improving partial discharge detection devices can be seen in U.S. Pat. Nos. 4,897,607 to Grunewald et al., 4,967,158 to Gonzalez, and 5,506,511 to Nilsson et al. These devices employ a method of detecting partial discharge through the measurement and analyzation of high frequency sound waves attributed to partial discharge through the use of transducers, microphones and other sound wave detecting devices. Unfortunately, inherent disadvantages in the use of such devices exist. For example, naturally occurring and man-made acoustic phenomenon exist in all frequencies and incident and co-incident phase modes in ambient air. Such phenomenon is known to be detected by transducers, microphones and the like. It is therefore necessary to employ filtration circuitry in an attempt to remove the undesired random signals from the actual signal to be analyzed. Without filtration, it would be difficult to determine that the reading produced by the detection device is actually that of a partial discharge signal. Further, in the case that the electrical system to be tested is a transformer, the sound wave receiving devices of these prior art references are susceptible to vibrations of the transformer tank walls. In particular, as an acoustic signal propagates from the partial discharge point, it travels through the insulating medium and eventually strikes the tank wall. Accordingly, if a microphone is attached to the tank wall, the signal that the microphone receives may be that of the signal traveling through the steel wall, in that sound waves travel quicker through a solid material than through a liquid or gas. Further, all of these prior art devices require that the system be analyzed in a "pure" test environment. In other words, the system needs to be taken "off-line." Additionally, pure test environments should include the use of copper shielded rooms or anechoic chambers to ensure that no random disturbances can effect the test results. These type of testing rooms are expensive to build and maintain. In regards to instrument transformers, as used by utility companies, taking them off-line can have detrimental economic consequences, since instrument transformers are used for consumer billing purposes. Still further deficiencies in these prior art devices are that the Nilsson device will not work in a dry-type transformer. And, even though the Gonzalez device incorporates alarm circuitry for alerting that a fault is about to occur, nothing disclosed therein teaches or suggests that the alarm circuitry should work in tandem with switching and/or relaying circuitry which could take the piece of equipment off-line. Further, nothing in Gonzalez suggests or teaches remote monitoring and/or alarming.

As discussed above, many disadvantages exist within the prior art. Most prior art devices require that the electrical system to be tested be taken off-line for the purpose of the test. Further, many of the prior art devices lack portability. Still further, most prior art devices employ detection technology that is susceptible to interference from random electromagnetic radiation and corrupted signals.

An improved device is needed which overcomes all of the deficiencies seen in the prior art. In particular, the device should be unobtrusive (i.e., passive in nature) such that the electrical system to be tested can remain "on-line" during testing thereof. But, the device should ensure that no feedback is introduced into the system if the system is to remain "on-line" during the test. Further, the improved device should be portable, thereby permitting a technician to take partial discharge readings in the field, regardless of the remoteness of the location. Still further, the device should be designed with detection technology that is more impervious to interference from naturally occurring and man-made electrical phenomenon without the need of sophisticated filtering circuitry or special testing environments (copper shielded room and/or anechoic chamber). Yet still further, the device should incorporate a means for alarming that a fault is possible as well as a means for controlling (i.e., shutting down) the device being tested/monitored in response to the alarm. Yet still even further, the device should be inexpensive and easy to manufacture.

SUMMARY OF THE INVENTION

The novel partial discharge detection device of the present invention improves upon known prior art detection devices and overcomes all of the deficiencies seen therein. In particular, the device of the present invention is not susceptible to ambient electromagnetic radiation and therefore will not produce a false partial discharge reading based on reception thereof. The use of the device does not require the employment of a special testing room. Further, the detection device of the present invention incorporates alarm and control circuitry. Accordingly, this novel partial discharge detection device can warn a user of an impending fault in the electrical system being tested and thereafter shut down the system.

The novel device of the present invention is also passive in nature. In other words, it is not necessary to take the electrical system to be tested "off-line." This permits the testing of the electrical system under normal operating and load conditions. Further, while the electrical system is being tested "on-line," no feedback is introduced into the system. The device can be permanently installed, allowing twenty-four hour measuring and monitoring, or be removably attached allowing the detection device to separately test a multitude of electrical systems in a given area (i.e., separately test all of the transformers in a power sub-station). This represents a huge improvement over the prior art which discloses devices at two extremes: (1) permanent devices that can monitor/measure while the system is "on-line," and (2) removable/portable devices that can monitor/measure the system but only "off-line."

The device of the present invention is also easy and inexpensive to manufacture. The detection device can incorporate all of the its circuitry in a single small box. Accordingly, multiple devices can be purchased by a single company such that all of their field technicians can include the device in their set of field tools.

The novel partial discharge detection device employs a DC power source, a sensor circuit and a relay circuit. The power source is common to all circuits. The sensor circuit is a picocoulomb sensor for measuring the electric charge of a pulse of a partial discharge signal occurring in the electrical system to which the detection device is coupled. In a preferred embodiment, the picocoulomb sensor (or sensor circuit) employs either an air or amorphous core coil. Various networks of wide band amplification, high-pass filtration, precision rectification and peak detection pass a voltage to current converted signal to an output drive which is directly coupled to the relay circuitry of the device.

The relay circuit receives the signal and applies it through signal conditioning and a time delay circuit. Thereafter, the signal is directed to a pair of comparator networks which provide a reading from which latches, associated with a trip and alarm setting, can act. The trip and alarm settings are adjustable and set through the use of push buttons and dials on the front of the device. A digital panel meter continuously displays the picocoulomb reading with the push-buttons disengaged. Engaging the push-buttons displays the threshold value of the trip setting or alarm setting on the digital panel meter, respectively. The alarm setting threshold value is set to some percentage of the trip setting voltage.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Throughout the following detailed description, the same reference numerals refer to the same elements in all figures.

Figure 1:
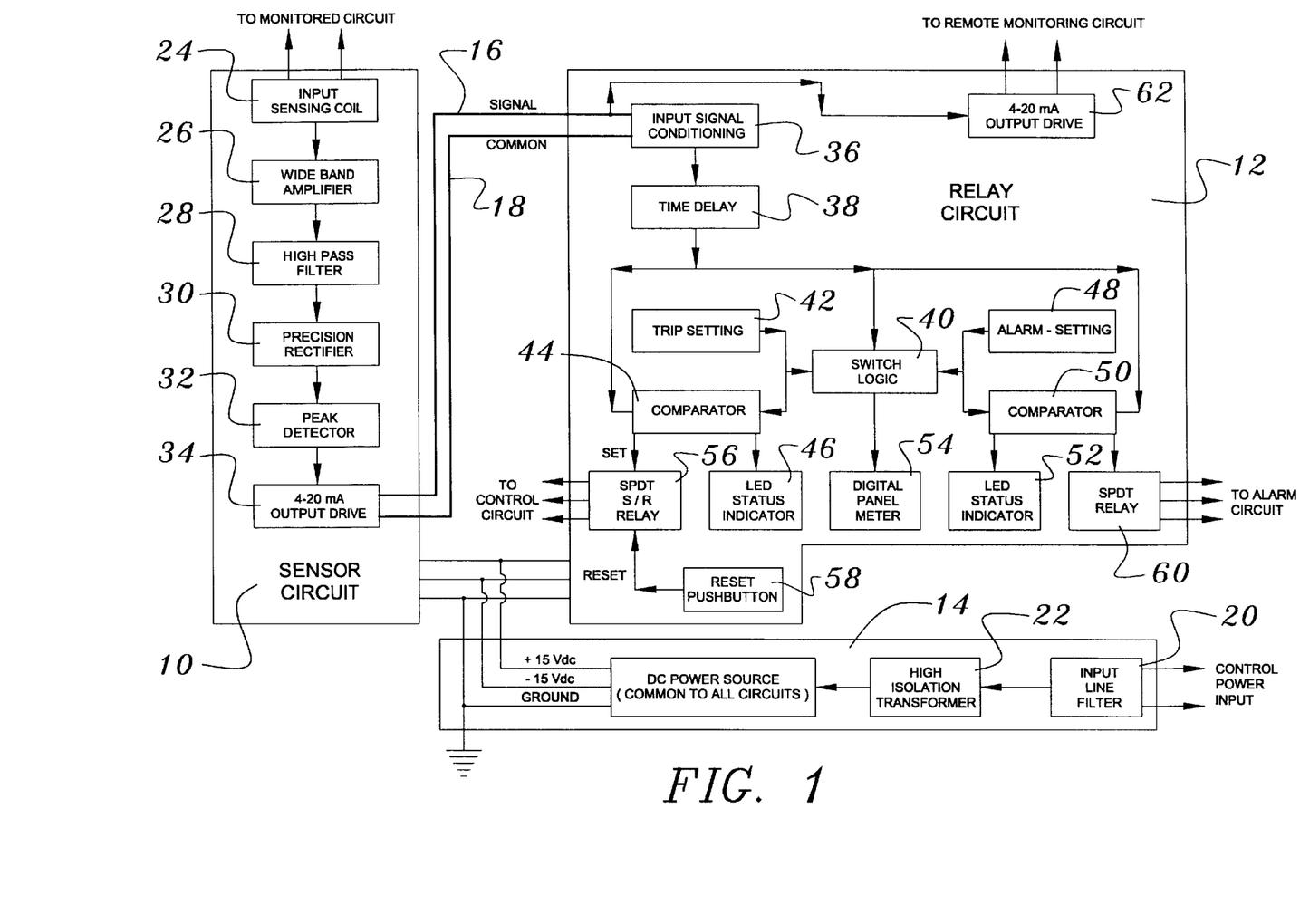
FIG. 1 is a block diagram illustrating the circuitry employed in a device of the present invention.

Referring to FIG. 1, a block diagram is shown depicting the circuitry employed in the partial discharge detecting device of the present invention. There are essentially three circuits associated with the partial discharge detecting device and include: a sensor circuit 10, a relay circuit 12 and a power supply circuit 14. Relay circuit 12 and power supply circuit 14 are enclosed within a single box, whereas sensor circuit 10 couples to relay circuit 12 and power supply circuit 14 via cabling. In particular, sensor circuit 10 is coupled to relay circuit 12 by a signal pathway 16 and a common pathway 18 (common only to an output drive of sensor circuit 10 and a primary input of relay circuit 12). The partial discharge detecting device of the present invention can incorporate a pair of sensor circuits 10 (although not shown in FIG. 1). If a pair of sensor circuits 10 are employed, connection to relay circuit 12 is made at primary and secondary inputs, shown as 70 and 72, respectively, on FIG. 3.

Power supply circuit 14 is a DC power source suppling +(positive) and −(negative) 15 Vdc to sensor and relay circuits, 10 and 12 respectively, and +(positive) and −(negative) 5 Vdc to a digital panel meter (to be discussed in further detail hereinafter). The + and −15 Vdc is common to all circuits of the partial discharge detecting device. Power supply circuit 14 is additionally coupled to a common ground.

Figure 5:
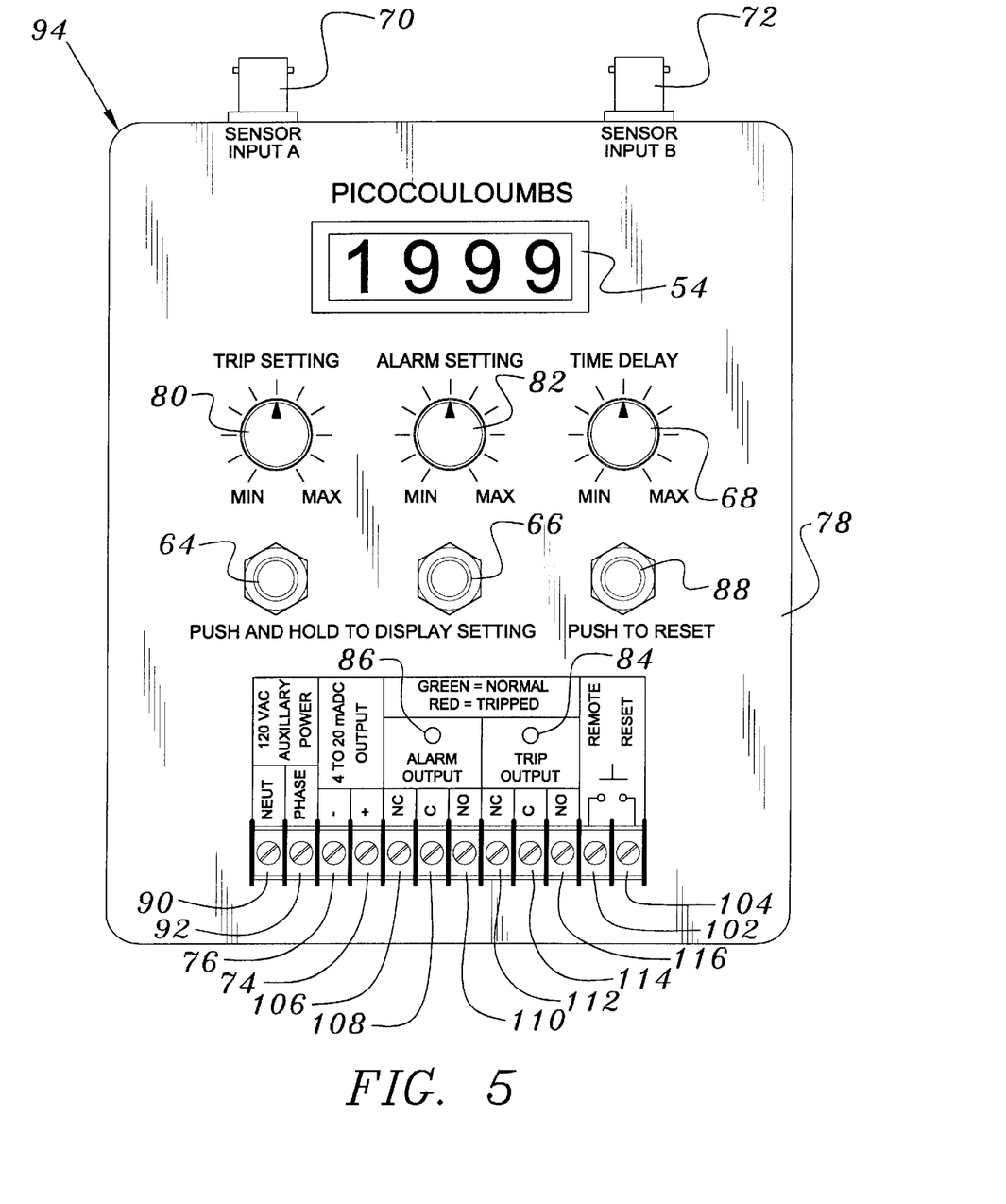
FIG. 5 is a front view of the device of the present invention.

Further to FIG. 1, power supply circuit 14 includes an input line filter 20, a high isolation transformer 22 and noise filtration (not shown). Input line filter 20 is a low pass filter for precluding any RF and high frequency noise from passing therethrough. In the preferred embodiment, a high frequency choke and a network of high frequency by-pass capacitors are employed. High isolation transformer 22 converts the line voltage (120 Vac) to 24 Vac for further rectification by a bridge rectifier which outputs the 24 Vdc. In the preferred embodiment, a 120:24 AC step-down transformer is employed. The noise filtration receives the 24 Vdc and ensures that any residual high frequency noise is eliminated from power supply circuit 14. In the preferred embodiment, the noise filtration is a network of capacitors, resistors, transistors and zener diodes. A first pair of voltage regulators supplies +(positive) and −(negative) 15 Vdc for the electrical components of the partial discharge device. A second pair of voltage regulators supplies +(positive) and −(negative) 5 Vdc for all logic components used in the partial discharge device, such as, for example, the digital panel meter. A pair of capacitors (one for positive and one for negative) are employed at each stage of the power supply circuit for additional filtration and noise elimination in the circuit. Power supply circuit 14 connects to an AC main through input line filter 20 at the "Control Power Input" connection point as shown in FIG. 1. An alternate or auxiliary power connection point NEUT 90 and PHASE 92 is provided on front panel 78 of partial discharge detecting device 94 as shown in FIG. 5. In it noted that in the preferred embodiment, connection to an AC power source is employed. Although, in an alternate embodiment, a DC power source could be used. Further, in the preferred embodiment, the "Control Power Input" is connected to a separate power source (the AC main), although in an alternate embodiment, the "Control Power Input" could be coupled to a power source provided from the electrical system to be monitored.

Figure 2:
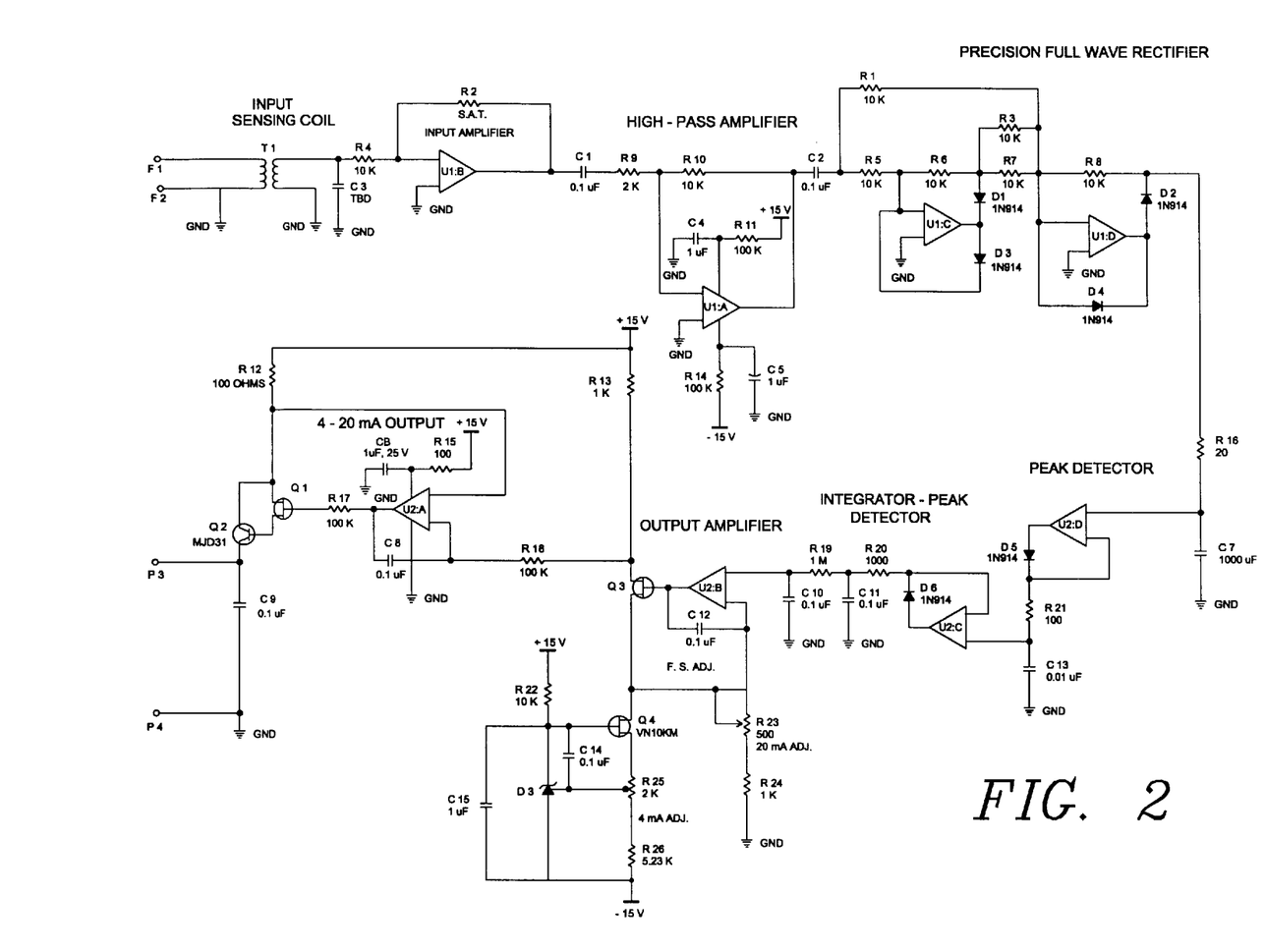
FIG. 2 is a schematic diagram of the sensing circuitry of the device.

With continuing reference to FIG. 1, it is shown that sensor circuit 10 includes the following elements: an input sensing coil 24, a wide band amplifier 26, a high-pass filter 28, a precision rectifier 30, a peak detector 32 and an output drive 34. Each of the aforementioned elements of sensor circuit 10 correspond to a network of electrical components shown in FIG. 2. It is understood that the electrical components and their associated values shown in FIG. 2 are those of the preferred embodiment. Accordingly, it is possible to substitute other electrical components and/or change the values disclosed therein to reach the same result that partial discharge detecting device 94 carries out. Further, if a pair of input sensors are employed with partial discharge device 94, as done in the preferred embodiment, a pair of FIG. 2 circuits, acting independently of each other, would be employed. When two sensor circuits 10 are used, each have their own dedicated input circuit and output drive. In this disclosure, sensor circuit 10 is also referred to as a pico-coulomb sensor and will be discussed in further detail hereinafter.

Figure 4:
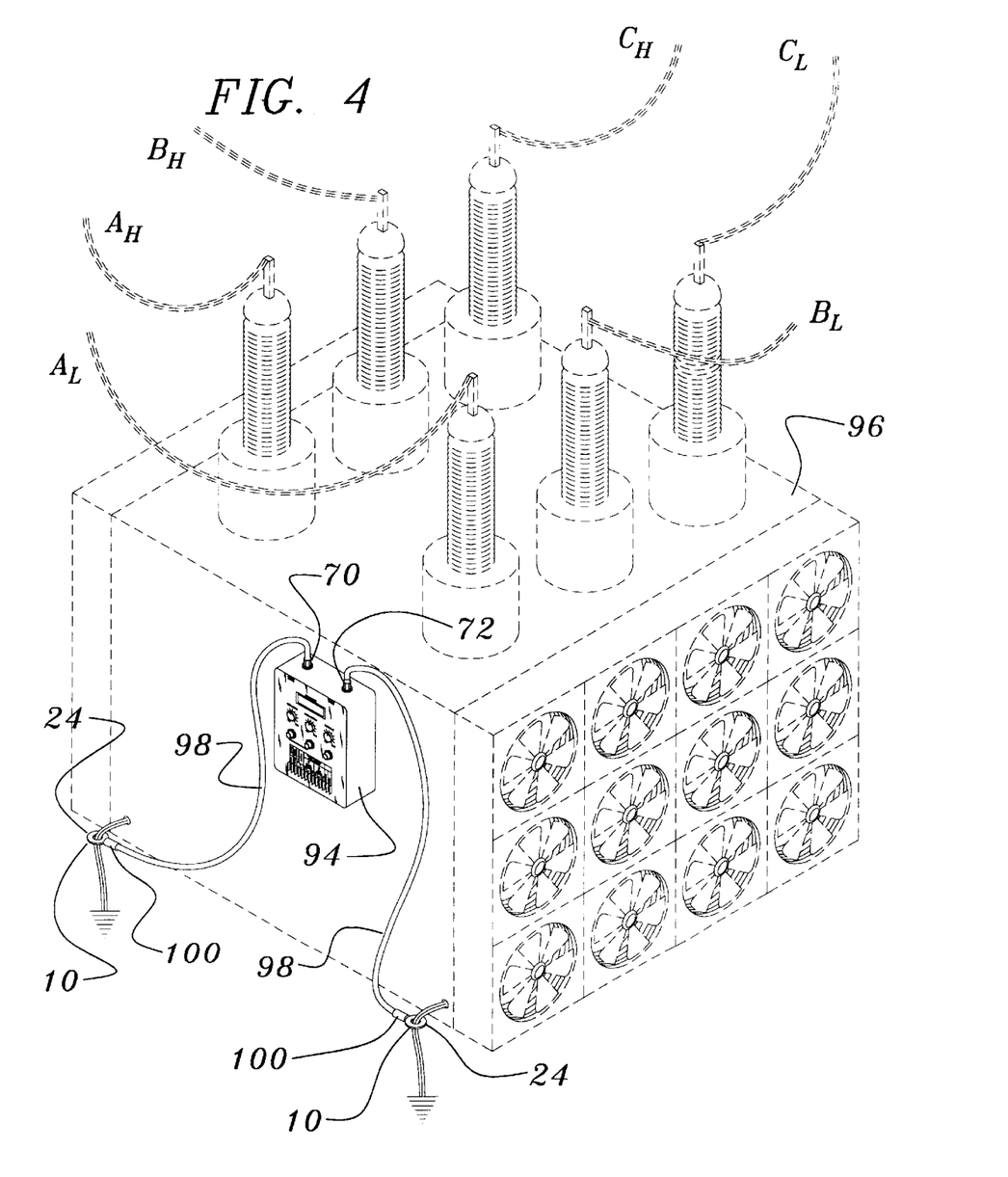
FIG. 4 is a perspective view illustrating how the device of the present invention is employed in the preferred embodiment.

With continuing reference to FIG. 1, input sensing coil 24 couples directly to an electrical system (or the "Monitored Circuit" as shown in FIG. 1) for continuous detection of a partial discharge level present therein. The type of electrical systems that can be tested includes, but is not limited to, transformers, generators, motors, capacitor banks and bushings. As shown in FIG. 4, partial discharge detecting device 94 is connected to a three phase power transformer 96, the preferred electrical system to monitor. It is noted that the preferred partial discharge detecting device is a portable unit which can be set next to the system to be monitored. FIG. 4 illustrates a mounted device.

Input sensing coil 24 is an air core coil (T1 of FIG. 2) designed to detect the high frequencies inherent in partial discharge for later amplification and signal conditioning by the subsequent circuit. Typically this signal is a high frequency pulse in the area of 200 KHz. Input sensing coil 24 couples directly to wide band amplifier 26 which amplifies all frequencies detected by input sensing coil 24 to a useable level for the high-pass filter as shown in FIGS. 1 and 2. High-pass filter 28 allows all of the high frequency signals of interest to pass therethrough while simultaneously blocking all of the low frequency signals of no interest. The output of high-pass filter 28 is directed to precision rectifier 30 for rectification of the received signal into a DC control signal. The rectified signal is outputted to peak detector 32 which acts to capture the peak of the applied signal from precision rectifier 30. Although not shown as a separate item in FIG. 1, an additional stage of peak detection and integration is employed (as shown in schematic FIG. 2) to smooth the signal to a relatively steady DC level that is proportional to the picocoulomb input signal. Peak detector 32 directs the DC signal to output drive 34 which acts as a voltage to current conversion circuit (or process control loop). The resulting signal outputted to relay circuit 12 spans 4–20 mA, wherein 4 mA is the offset and represents a 0 pC signal and 20 mA is the full-scale and represents a 2000 pC signal. This portion of sensor circuit 10 acts as a pre-amp providing improved signal-to-noise ratio, thereby ensuring signal integrity for the input of relay circuit 12. Since the signal passes through some length of cable 98 between sensor circuit 10 and relay circuit 12, it could be susceptible to extraneous noise. In the preferred embodiment, wide band amplifier 26, high-pass filter 28, precision rectifier 30, peak detector 32 and 4–20 mA output drive 34 are all enclosed within a small sleeve 100 and directly coupled to input sensing coil 24. Further, input sensing coil 24 is a "clamp-on" style coil for engaging the ground of the electrical system, such as a transformer, as shown in FIG. 4. In the preferred embodiment, sensing coil 24 is either cast in epoxy or encapsulated in resin.

In an alternate embodiment, sensor circuit 10 and relay circuit 12 are enclosed within the same box. In such embodiment, output drive 34 could be removed from sensor circuit 10 due to being in close coupled electrical proximity of one another. One example of the alternate embodiment provides for a single box enclosing sensing circuit 10, relay circuit 12 and power supply circuit 14. A large center opening is formed in the box allowing the ground lead of the electrical system to pass therethrough. In such embodiment, input sensing coil 24 would surround the center opening.

In yet another alternate embodiment, input sensing coil 24 has an amorphous core. The use of an amorphous core coil has certain advantages over an air core coil, such as, for example, a larger energy transfer capability and a lesser possibility of "burn-out." Although, saturation of the amorphous core can occur in the presence of high current conditions. Under normal operating conditions, sensor circuit 10 should not see more than 200A of unbalanced or ground currents (which is an acceptable level to receive on a continuous basis). Higher currents, on the other hand, may result in amorphous core coil saturation, which could cause the sensors to be insensitive to picocoulomb signals. If sensor circuit 10 sees more than 200A of sinusoidal current, an alarm output (to be discussed in further detail hereinafter) will trip. This effectively warns an operator that a condition may exist which could cause relays in relay circuit 12 to not work properly in response to receipt of a picocoulomb signal. In other words, saturation of the amorphous core coil could cause a trip, but will not necessarily cause the partial discharge detecting device to fail. It is also noted that the partial discharge detecting device of the present invention is capable of recognizing and reacting to arcing ground faults due to the inherent characteristics of the device (i.e., the device's ability to recognize a very narrow current pulse).

With continuing reference to FIG. 1, it is shown that relay circuit 12 includes the following elements; input signal conditioning 36, time delay 38, switch logic 40, trip setting 42 and an associated comparator 44 and LED status indicator 46, alarm setting 48 and an associated comparator 50 and LED status indicator 52, a digital panel meter 54, a trip setting latched relay 56 (mechanically held), a trip setting reset 58, an alarm setting relay 60 (electronically held) and an output drive 62.

Figure 3:
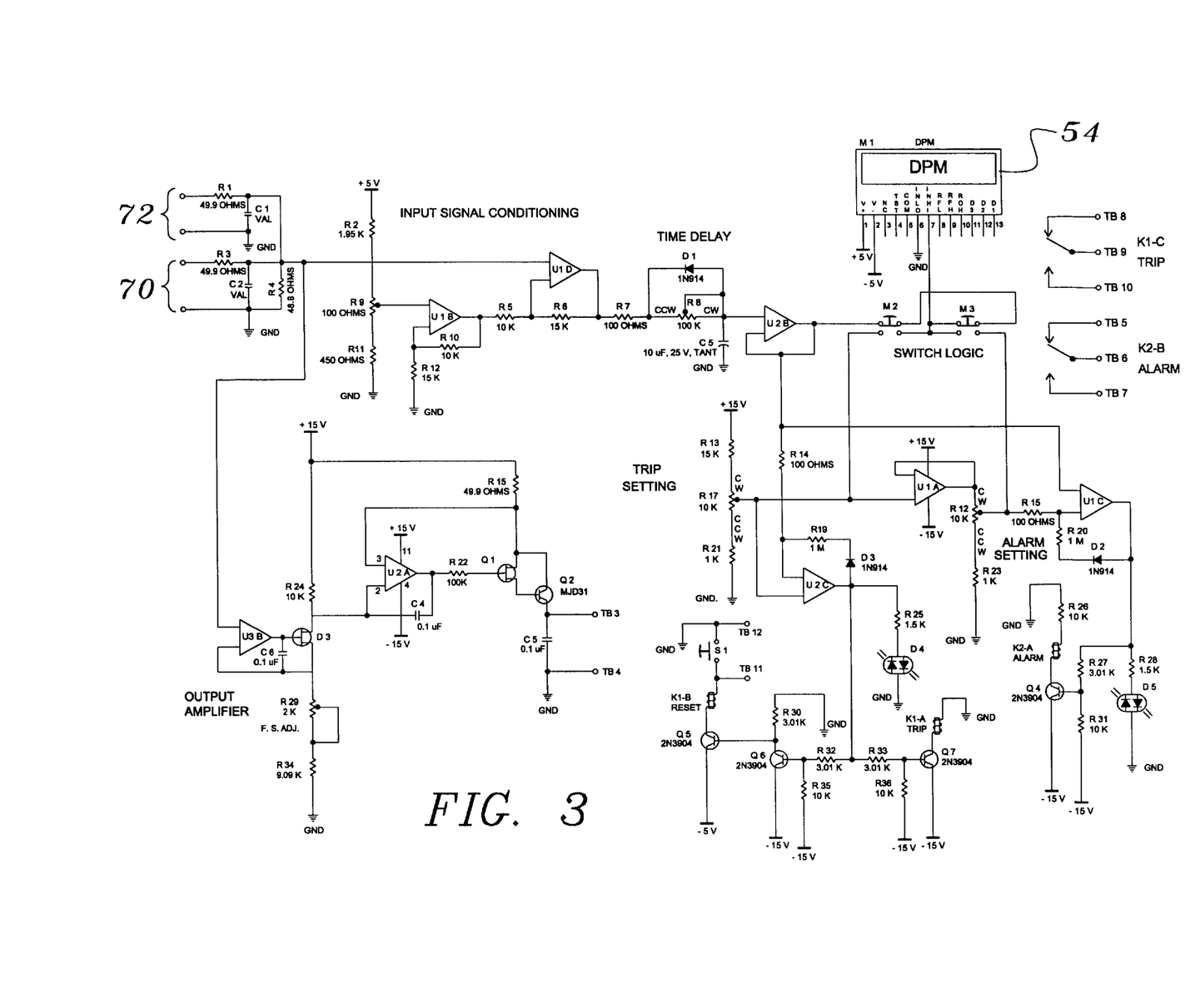
FIG. 3 is a schematic diagram of the relay circuitry of the device.

With reference again to FIG. 1, the 4–20 mA signal is directed from sensor circuit output drive 34 to a pair of input connection points 70 and 72 of relay circuit 12 (see FIG. 3). A first input 70 (the primary input), is used to receive the signal from a first picocoulomb sensor (sensor circuit 10), while a second input 72 (the secondary input) is used to receive a signal from a second picocoulomb sensor (sensor circuit 10). As stated before, a pair of sensor circuits 10 (or picocoulomb sensors) can be employed with the device of the present invention. In such embodiment, each sensor circuit 10 is functionally independent of the other; the only common circuitry being the DC power source. This redundant configuration ensures high reliability such that if one of the two sensor circuits fail, the other will sound an alarm or trip if the signal exceeds approximately twice the preset level. This result is achieved due to the fact that when two sensors are employed, the sum of the partial discharge pulse in picocoulombs is divided between the two sensors. In an alternate embodiment, the 4–20 mA output drive from sensor circuit 10 could be utilized to recognize (and thereby alarm) that one or both of inputs have failed. As shown in FIG. 4 partial discharge detecting device 94 employs a pair of sensor circuits 10. Referring to both FIGS. 4 and 5, it is shown that device 94 includes a pair of sensor inputs 70 and 72 also known as sensor inputs A and B respectively.

Referring again to FIG. 1, the signal, traveling along signal pathway 16 is first directed to input signal conditioning 36 for establishing a full scale 1 volt signal through a current to voltage conversion. Impressing the 20 mA full scale signal across a 50 ohm resistor yields a proportional 0.2–1 volt output signal in relation to the 4–20 mA input signal. Prior to any signal conditioning, the proportional 0.2–1 volt output signal is directed to output drive 62 for connection to an alternate monitoring and/or alarming circuit which can be locally or remotely positioned. The signal outputted to output drive 62 can be directed to the alternate monitoring/alarming circuit in a plurality of different manners, such as, for example, remote telemetry, fiber optics and RF carrier. As shown on FIG. 5, output drive +(positive) and –(negative) connection points, 74 and 76 respectively, positioned on a front panel 78 of the partial discharge detecting device, permit connection to the alternate monitoring/alarming circuit. As shown on FIG. 3, +(positive) connection point 74 corresponds to TB4 and –(negative) connection point 76 corresponds to TB3.

Further to FIG. 1, the signal outputted from signal conditioning 36 is directed to time delay 38 to provide a means for removing any transient spikes or switching surges that may cause relay circuit 12 to improperly trip or alarm. Time delay 38 is a continuously adjustable user setting which has an inverse definite minimum time characteristic. Because the input signal passes through the circuitry of time delay 38 before it passes through the circuitry of trip setting 42 and alarm setting 48, its setting has the same effect on both trip setting 42 and alarm setting 48. Initially, time delay 38 exhibits an inverse time characteristic. When the input signal reaches a value that is approximately equal to a value that is ten (10) times the setting (of either the trip or alarm setting), time delay 38 reaches its minimum time as determined by the inherent minimum response time of relay circuit 12. The user adjustable dial 68 on front panel 78 is used to control the response time for signals that are close to either the alarm or trip settings and exhibits an inverse time delay characteristic. That is, the higher a signal above the threshold (in picocoulombs), the faster relay circuit 12 responds until it reaches the minimum response time for relay circuit 12. After this point, any further increase in the input signal will not cause a corresponding decrease (a faster) response time.

Time delay 38 is set by adjusting delay setting dial 68 on front panel 78, as shown on FIG. 5, and which corresponds to variable resistor R8 of FIG. 3. CW (or clockwise) as shown on FIG. 3 corresponds to "MAX" on FIG. 5 of dial 68, whereas CCW (or counter clockwise), also of FIG. 3, corresponds to "MIN" on FIG. 5 of dial 68. If dial 68 is set to "MIN", there is no intentional delay and time delay 38 causes relays 56 and 60 to latch in about 100 milliseconds without consideration of the magnitude of the fault of the signal received from the electrical system coupled to the partial discharge detecting device.

After the input signal passes through time delay 38 it is directed to switch logic 40 which provides a means for adjusting/setting trip and alarm setting, 42 and 48 respectively. As seen in FIG. 3, switch M2 is used to pass a threshold value in picocoulombs of trip setting 42 to meter 54, whereas M3 is used to pass a threshold value in picocoulombs of alarm setting 48 to meter 54. Referring to FIG. 5, M2 corresponds to trip setting push-button 64 and M3 corresponds to alarm setting push-button 66, both located on front panel 78. Engaging either push-button 64 or 66, passes the respective value to digital panel meter 54 for displaying a value between 0–2 volts which represents a threshold value in picocoulombs for each setting. With neither push-button engaged, digital panel meter 54 reads the picocoulomb input signal being detected by device 94 at that moment in time. As illustrated in FIG. 5, digital panel meter reads 1999. This value, merely an example of a potential reading, represents 1999 picocoulombs. Accordingly, digital panel meter 54 displays a numeric value between 0–1999 which corresponds to a picocoulomb value between 0–1999 picocoulombs. Since the signal received by relay circuit 12 from sensor circuit 10 ("output" signal) is in the range of 4–20 mA, thereby providing a "span" of 16 mA, the level of partial discharge (that which is detected by device 94 and displayed by meter 54) is determined by the following equation (where "PD" equals the level of partial discharge in picocoulombs and the "offset" equals 4 mA):

$$PD = \frac{\text{outputmA} - \text{offsetmA}}{\text{spanmA}} \times 2000$$

It therefore follows that an output signal having a value of 12 mA (a value used for illustrative purposes only) would equal 1000 picocoulombs:

$$1000 \text{ picocoulombs} = \frac{12\text{mA} - 4\text{mA}}{16\text{mA}} \times 2000$$

Such a reading would be displayed on meter 54 as 1000.

As shown on FIG. 5, trip setting 42 can be set by adjusting trip setting dial 80, located on front panel 78 of partial discharge detecting device 94. Referring to FIG. 3, trip setting dial 80 corresponds to variable resistor R17. Further to FIG. 5, alarm setting 48 can be set by adjusting alarm setting dial 82, also located on front panel 78 of partial discharge detecting device 94. Referring to FIG. 3, alarm setting dial 82 corresponds to variable resistor R12. For both dials, 80 and 82, CW (or clockwise), as shown on FIG. 3, corresponds to "MAX" on FIG. 5, and CCW (or counter clockwise), also of FIG. 3, corresponds to "MIN" on FIG. 5. It is understood that push-buttons 64 and 66, pass a picocoulomb value to meter 54 for the purpose of setting the respective threshold value of trip and alarm setting 42 and 48 respectively. It is therefore not necessary to engage push-buttons 64 or 66 for setting the values. But without doing so, the user would not know the threshold picocoulomb value to which each setting is set. Of course, the user could adjust either setting and then engage the respective push-button for reading the set value. But in the preferred embodiment, push-buttons 64 and 66 are engaged before setting each respective threshold value.

Once the threshold levels are set for both trip setting 42 and alarm setting 48, each use an associated comparator, 44 and 50 respectively, for detecting any changes (exceeding the threshold value) which gives rise to the latching of the relays associated therewith. Further, trip setting 42 and alarm setting 48 each have an associated bi-color LED, D4 and D5 respectively of FIG. 3 (corresponding to LED status indicator 46 and 52 respectively of FIG. 1) for indicating either a "normal" or "tripped" state. As shown on FIG. 5, trip setting LED status indicator 46 is shown as trip output LED 84 and alarm setting LED status indicator 52 is shown as alarm output LED 86. As further illustrated on FIG. 5, a "normal" state for either output is represented by green illumination of the LED, whereas a "tripped" state for either output is represented by red illumination of the LED. No color in LED 84 and 86 indicates a loss of control power.

Referring to FIG. 1, the signal passing through trip setting 42 is directed to relay 56. In the preferred embodiment, relay 56 is a mechanically latching SPDT set-reset relay. This type of relay has a set and a reset coil. Referring to FIG. 3, K1-A is the set coil (although designated "trip" herein) and K1-B is the reset coil. The output of relay 56 is coupled to a circuit ("Control Circuit") which controls the electrical system to which partial discharge detecting device 94 is connected. For example, if the electrical system is a transformer, relay 56 can be coupled to a control circuit for the transformer which takes the transformer off-line before any failure of the transformer.

Relay 56 will not respond to a loss of control power. Although, if there is a loss of control power, oversized capacitors in power supply circuit 14 will allow relay 56 to change state, or trip, for as long as one minute after the loss of the control power, so long as the picocoulomb signal exceeds the set threshold value. With partial discharge detecting device 94 energized, relay 56 will remain in a "normal", or non-tripped state. If the picocoulomb value of the input signal exceeds the threshold (or trip pick-up) set for trip setting 42, relay 56 will change state or "trip."

Relay 56 can be configured for either automatic or manual reset. Both configurations require the application of control power to affect a reset. Automatic reset is configured by installing a jumper on the terminal strip—TB11 and TB12 of FIG. 3. If automatic reset is used, relay 56 will reset to its "normal" state, after a trip has occurred, when trip setting 42 recognizes that the picocoulomb input signal has fallen below the set threshold value. If manual reset is used, then the user must reset relay 56 by engaging push-button 88 located on front panel 78 as shown in FIG. 5. Push-button 88 corresponds to switch S1 of FIG. 3. Relay 56 can not be reset until the picocoulomb input signal falls below the trip setting threshold value. Accordingly, engaging push-button 88 will not affect the state of relay 56 until the picocoulomb value falls below the threshold. As shown in FIG. 5, the reset can also be remotely controlled by coupling a remote reset switch to connection points 102 and 104 ("Remote Reset") which correspond to TB11 and TB12, respectively, of FIG. 3.

Referring again to FIG. 1, the signal passing through alarm setting 48 is directed to relay 60. In the preferred embodiment, relay 60 is an electrically held SPDT relay. The output of relay 60 is coupled to a circuit ("Alarm Circuit") for signaling (alarming) that a level of partial discharge (in picocoulombs) has been reached which may cause failure to the electrical system to which the partial discharge detecting is coupled. Since relay 60 is electrically held, it additionally provide a means for signaling that there has been a loss of control power. When control power is first applied, relay 60 changes state to its energized position and remains transferred unless there is loss of control power or alarm setting 48 recognizes that the picocoulomb value of the input signal exceeds the set threshold value. Adjusting the alarm setting threshold value will not affect the trip setting threshold value. Although meter 54 reads a picocoulomb value when push-button 66 is engaged, the value is actually a percentage of the trip setting threshold value. The alarm setting threshold value can never be higher than the trip setting threshold value. Since the trip setting threshold value has a range of 0–2000, it follows that the alarm setting threshold value has a range equal to 0–100% of the trip setting. For example, if the trip setting is set at 1000 picocoulombs and the alarm setting is set to 50%, the corresponding alarm threshold value, or the point at which alarm relay 60 would trip, would be 500 picocoulombs. If the trip setting threshold value is changed, the alarm setting threshold value will also change proportionally such that it remains at a percentage value as compared to the trip setting threshold value. It is therefore recommended that the user first set the trip setting threshold value. By way of example, using the figures directly hereinabove, if the trip setting is adjusted to 1500 picocoulombs and the alarm setting is left alone (at 50%), the corresponding alarm threshold value, or the point at which alarm relay 60 would trip, is now 750 picocoulombs.

Referring to FIG. 3, it is shown that relay circuit 12 contains a set of auxiliary connection points (or outputs) for the alarm and trip relays 56 and 60 respectively. In particular, alarm relay 60 is associated with connection points TB5, TB6 and TB7 of K2-B Alarm. Whereas, trip relay 56 is associated with connection points TB8, TB9 and TB10 of K1-C Trip. Referring to FIG. 5, alarm output connections 106, 108 and 110 are equivalent to TB5, TB6 and TB7, respectively, and trip output connections 112, 114 and 116 are equivalent to TB8, TB9 and TB10, respectively.

Referring to FIG. 5, dials 80 and 82 are shown with hash marks. As to dial 80, "MIN" equals 0 picocoulombs with each subsequent mark representing a 200 picocoulomb increment such that "MAX" equals 2000 picocoulombs. As to dial 82, "MIN" equals 0% with each subsequent mark representing a 10% increase such that "MAX" equals 100%. Both dials 80 and 82 are sweep style dials allowing for smaller increment settings between each hash mark.

It is noted that all electrical systems having conductors exhibit varying partial discharge readings. It is not necessarily the presence of partial discharge that is an indicator of a problem but rather the rise in partial discharge over a period of time. If that period of time is short, a problem could be arising in the system. When partial discharge detecting device 94 is first installed, the user takes a first reading which could be considered the ambient value. If that value, over time, does not change and is one that is acceptable to the user, no action necessarily needs to be taken. But, as that value begins to climb, it is most likely an indicator of some type of problem relating to partial discharge.

Equivalent elements and/or components can be substituted for the ones set forth above such that they perform the same function in the same way for achieving the same result.

Having thus described the invention what is claimed and desired to be secured by Letters Patent is:

1. A device for detecting partial discharge in an energized electrical system having a control circuit, the device comprising:
    a) at least one sensor circuit having an input sensing coil and an output, the input sensing coil measuring a picocoulomb value of a partial discharge pulse emanating from the electrical system, the at least one sensing circuit capable of capturing a high frequency input signal associated with the partial discharge pulse and converting the high frequency input signal into a DC control signal for applying to the sensor circuit output, the at least one sensor circuit electrically coupled to a first ground of the electrical system,
    b) a relay circuit having at least one sensor input, a trip network and an alarm network, the at least one sensor input electrically coupled to the output of the at least one sensor circuit, the trip and alarm networks electrically coupled to the at least one sensor input, the trip network having at least one relay for latching in response to the picocoulomb value of the partial discharge pulse measured by the at least one sensor circuit exceeding a trip setting picocoulomb threshold value, the trip network at least one relay electrically coupled to the electrical system control circuit, the alarm network having at least one relay for latching in response to the picocoulomb value of the partial discharge pulse measured by the at least one sensor circuit exceeding an alarm setting picocoulomb threshold value, the alarm network at least one relay electrically coupled to an alarm circuit, and
    c) a DC power source common to the at least one sensor circuit and the relay circuit.

2. The device of claim 1, further comprising, the at least one sensor circuit having a wide band amplifier electrically coupled to the input sensing coil, a high-pass filter electrically coupled to the wide band amplifier, a precision rectifier electrically coupled to high-pass filter, a peak detector electrically coupled to the precision rectifier and the sensor circuit output electrically coupled to the precision rectifier.

3. The device of claim 2, wherein the sensor circuit output is a 4–20 mA output drive.

4. The device of claim 3, wherein the 4–20 mA output drive is a process control loop for converting the DC control signal to a current-based control signal.

5. The device of claim 1, wherein the input sensing coil is an air core coil.

6. The device of claim 1, wherein the input sensing coil is an amorphous core coil.

7. The device of claim 1, wherein a pair of sensor circuits are employed, the first sensor circuit coupled to the first ground of the electrical system and the second sensor circuit coupled to a second ground of the electrical system.

8. The device of claim 7, wherein the relay circuit has a pair of sensor inputs, each receiving an independent signal directed from the pair of sensor circuits.

9. The device of claim 8, wherein the pair of signals received by the pair of relay circuit sensor inputs are summed directly after the sensor inputs.

10. The device of claim 8, wherein each sensing coil of each sensor circuit is enclosed within separate clamping mechanisms which are electrically coupled to separate sleeve members which are electrically coupled to separate cables, each cable electrically coupled to one of the pair of relay circuit sensor inputs, each sleeve member enclosing all other circuitry of each sensor circuit.

11. The device of claim 10, wherein the relay circuit and the DC power source are enclosed with a single box.

12. The device of claim 1, further comprising, the relay circuit having a time delay electrically coupled to the at least one sensor input, a meter for displaying numeric values and a switch logic electrically coupled to the time delay, the meter, the trip network and the alarm network, the switch logic directing numeric values associated with the signal received by the relay circuit at least one sensor input, the trip network and the alarm network to the meter.

13. The device of claim 1, further comprising, the relay circuit trip network having a picocoulomb value trip setting, a comparator for comparing the picocoulomb value of the partial discharge pulse measured by the at least one sensor circuit against a picocoulomb threshold value set by the trip setting, a relay and an LED status indicator.

14. The device of claim 1, further comprising the relay circuit alarm network having a picocoulomb value alarm setting, a comparator for comparing the picocoulomb value of the partial discharge pulse measured by the at least one sensor circuit against a picocoulomb threshold value set by the alarm setting, a relay and an LED status indicator.

15. The device of claim 4, further comprising, the relay circuit having an input signal conditioner electrically coupled to the relay circuit at least one sensor input, the input signal conditioner converting the current-based control signal to a voltage-based control signal.

16. The device of claim 15, wherein an auxiliary 4–20 mA output drive is electrically coupled intermediate the relay circuit at least one sensor input and the input signal conditioner.

17. The device of claim 1, further comprising, the DC power source having a control power input coupled to an external power source.

18. The device of claim 17, wherein the electrical system is a three phase power transformer.

19. A device for detecting partial discharge in an energized electrical system having a control circuit, the device comprising:
  a) at least one sensor circuit having an input sensing coil, a precision rectifier and an output drive, the input sensing coil receiving a high frequency input signal through a first ground of the electrical system and measuring a picocoulomb value associated therewith to determine a level of partial discharge in the electrical system, the precision rectifier converting the high frequency input signal into a DC control signal for applying to the output drive, the output drive converting the DC control signal into current-based control signal,
  b) a relay circuit having at least one sensor input, an input signal conditioner, a trip network and an alarm network, the at least one sensor input electrically coupled to the output drive of the at least one sensor circuit, the input signal conditioner electrically coupled to the at least one sensor input of the relay circuit, the trip and alarm networks electrically coupled to input signal conditioner, the relay circuit at least one sensor input receiving the current-based control signal from the at least one sensor circuit, the input signal conditioner receiving a summed value of the current-based control signal from the at least one sensor input and converting the summed signal into a single DC control signal, the trip and alarm networks each receiving the single DC control signal, the trip network having at least one relay for latching in response to the picocoulomb value of the single DC control signal exceeding a trip setting picocoulomb threshold value, the trip network at least one relay electrically coupled to the electrical system control circuit, the alarm network having at least one relay for latching in response to the picocoulomb value of the single DC control signal exceeding an alarm setting picocoulomb threshold value, the alarm network at least one relay electrically coupled to an alarm circuit, and
  c) a DC power source common to the at least one sensor circuit and the relay circuit, the DC power source having a control power input coupled to an external power source.

20. The device of claim 19, further comprising, the at least one sensor circuit having a wide band amplifier electrically coupled to the input sensing coil, a high-pass filter electrically coupled to the wide band amplifier, the precision rectifier electrically coupled to high-pass filter, a peak detector electrically coupled to the precision rectifier and the output drive electrically coupled to the precision rectifier.

21. The device of claim 20, wherein the output drive of the at least one sensor circuit directs current-based control signals in the range of 4–20 mA to the relay circuit.

22. The device of claim 19, wherein the input sensing coil is chosen from the group consisting of air core and amorphous core coils.

23. The device of claim 19, wherein a pair of sensor circuits are employed, the first sensor coupled to the first ground of the electrical system and the second sensor circuit coupled to a second ground of the electrical system.

24. The device of claim 23, wherein the relay circuit has a pair of sensor inputs, each receiving an independent signal directed from the pair of sensor circuits.

25. The device of claim 24, wherein each sensing coil of each sensor circuit is enclosed within separate clamping mechanisms which are electrically coupled to separate sleeve members which are electrically coupled to separate cables, each cable electrically coupled to one of the pair of relay circuit sensor inputs, each sleeve member enclosing all other circuitry of each sensor circuit.

26. The device of claim 25, wherein the relay circuit and the DC power source are enclosed with a single box.

27. The device of claim 19, further comprising, the relay circuit having a time delay electrically coupled to the input signal conditioner, a digital panel meter for displaying numeric values and a switch logic electrically coupled to the time delay, the digital panel meter, the trip network and the alarm network, the switch logic directing numeric values to the digital panel meter associated with the signal received by the relay circuit at least one sensor input, the trip network and the alarm network.

28. The device of claim 19, further comprising, the relay circuit trip network having a picocoulomb value trip setting, a comparator for comparing the picocoulomb value of the high frequency input signal measured by the at least one sensor circuit against a picocoulomb threshold value set by the trip setting, a mechanically held set-reset relay and an LED status indicator.

29. The device of claim 28, wherein a mechanical push-button is provided on a front panel of the device for resetting the trip network relay.

30. The device of claim 28, wherein the trip network picocoulomb value trip setting is a first dial provided on a front panel of the device, the picocoulomb trip setting value capable of being displayed on the digital panel meter by engaging a first push-button of the switch logic located on the front panel of the device.

31. The device of claim 19, further comprising, the relay circuit alarm network having a picocoulomb value alarm setting, a comparator for comparing the picocoulomb value of the high frequency input signal measured by the at least one sensor circuit against a picocoulomb threshold value set by the alarm setting, an electrically held relay and an LED status indicator.

32. The device of claim 31, wherein the alarm network picocoulomb value alarm setting is a second dial provided on a front panel of the device, the picocoulomb alarm setting value capable of being displayed on the digital panel meter by engaging a second push-button of the switch logic located on the front panel of the device.

33. The device of claim 19, wherein an auxiliary current-based output drive is electrically coupled intermediate the at least one sensor input and the input signal conditioner of the relay circuit.

34. The device of claim 19, wherein the electrical system is a three phase power transformer.

35. A partial discharge detecting relay device for electrically coupling to an energized electrical system for measuring picocoulomb values associated with high frequency signals emanating from insulated conductors of the electrical system and responding to such measured values through the latching of relays, the partial discharge detecting relay device comprising:
  a) a pair of sensor circuits, each enclosed within an electrical coupling clamping mechanism, each having an input sensing coil surrounding the clamping mechanism for engaging ground leads of the electrical system, a precision rectifier coupled to the sensing coil and a current-based signal output drive coupled to the precision rectifier, the sensing coil detecting the high frequency signals, the precision rectifier converting the high frequency signals into DC control signals and current-based signal output drive converting the DC control signals into current-based control signals,
  b) a relay circuit having a pair of sensor inputs, an input signal conditioner, a trip network and an alarm network, the pair of sensor inputs coupled to the current-based output drives of the pair of sensor circuits, the input signal conditioner coupled to the pair of sensor inputs for receiving a summed value of the signals applied to the pair of sensor inputs and converting the summed signal into a voltage-based control signal, the trip and alarm networks coupled to the input signal conditioner and receiving the voltage-based control signal, the trip and alarm networks capable of latching relays in response to the picocoulomb value of the measured high frequency signal exceeding respective threshold set trip values, and
  c) a common DC power source coupled to the pair of sensor circuits and the relay circuit.

36. The partial discharge detecting relay device of claim 35, wherein the energized electrical system is a three phase power transformer.

37. The partial discharge detecting relay device of claim 35, wherein a pair of cables are used to couple the pair of sensor circuits to the pair of relay circuit sensor inputs.

38. The partial discharge detecting relay device of claim 35, further comprising, the relay circuit having a time delay electrically coupled to the input signal conditioner, a digital panel meter for displaying numeric values and a switch logic electrically coupled to the time delay, the digital panel meter, the trip network and the alarm network, the switch logic directing numeric values to the digital panel meter associated with the signals received by the relay circuit sensor inputs, the trip network and the alarm network.

39. The partial discharge detecting relay device of claim 35, further comprising:
  a) the relay circuit trip network having a picocoulomb value trip setting, a comparator for comparing the picocoulomb values of the high frequency signals measured by the pair of sensor circuits against a picocoulomb threshold value set by the trip setting, a mechanically held set-reset relay and an LED status indicator, and
  b) the relay circuit alarm network having a picocoulomb value alarm setting, a comparator for comparing the picocoulomb values of the high frequency signals measured by the pair of sensor circuits against a picocoulomb threshold value set by the alarm setting, an electrically held relay and an LED status indicator.

* * * * *